United States Patent [19]

Schimitzek

[11] Patent Number: 6,041,289
[45] Date of Patent: *Mar. 21, 2000

[54] METHOD AND DEVICE FOR A DATA MANAGEMENT SYSTEM WHICH IS CAPABLE OF CALIBRATION

[75] Inventor: Peter Schimitzek, Geilenkirchen, Germany

[73] Assignee: CSB-System Software-Entwicklung & Unternehmensberatung GmbH, Geilenkirchen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,036

[22] PCT Filed: Sep. 7, 1995

[86] PCT No.: PCT/DE95/01235

§ 371 Date: Mar. 21, 1997

§ 102(e) Date: Mar. 21, 1997

[87] PCT Pub. No.: WO96/09523

PCT Pub. Date: Mar. 28, 1996

[30] Foreign Application Priority Data

Sep. 23, 1994 [DE] Germany .................... 44 33 913
Sep. 23, 1994 [DE] Germany .................... 94 15 398 U
Mar. 17, 1995 [DE] Germany .................... 195 09 775

[51] Int. Cl.[7] ........................................ F25B 49/02
[52] U.S. Cl. .................... 702/187; 702/85; 702/101; 702/188
[58] Field of Search ......................... 702/57, 85, 101, 702/102, 173, 175, 187, 188

[56] References Cited

U.S. PATENT DOCUMENTS

| | | | |
|---|---|---|---|
| 5,224,707 | 7/1993 | Martin | 273/143 R |
| 5,437,163 | 8/1995 | Jurewicz et al. | 62/126 |
| 5,546,561 | 8/1996 | Kynett et al. | 711/163 |
| 5,579,489 | 11/1996 | Dornier et al. | 395/281 |

FOREIGN PATENT DOCUMENTS

0510312A1 2/1992 European Pat. Off. .
2167561A 11/1984 United Kingdom .

*Primary Examiner*—Marc S. Hoff
*Assistant Examiner*—Craig Steven Miller
*Attorney, Agent, or Firm*—Michael J. Striker

[57] ABSTRACT

The method of acquiring, calibrating and storing measured weight data in a secure manner and of acquiring and storing other non-calibratable measured data for display and processing includes providing calibratable weight data acquisition devices (2) and at least one non-calibratable data acquisition device (2) for non-calibratable data other than weight, providing an approved calibrating device (1) in non-interacting dialogue with each data acquisition device, wherein the approved calibrating device includes a computer (3) including a first driver (I,8), a second driver (II,10), a monitor (5), a memory and an EEPROM card (11); triggering the data acquisition devices (2) to obtain calibratable measured weight data and non-calibratable data besides weight; providing the measured weight data and non-calibratable data with references by means of the first driver (I,8), the second driver (II,10) and the EEPROM card (11) during transfer by the approved calibrating device (1); calibrating the measured weight data to obtain calibrated measured weight data; buffer-storing the calibrated measured weight data and the non-calibrated data in a manipulation-proof and non-erasable form on the EEPROM card (11) and transferring the buffered calibrated weight data from the EEPROM card (11) to the memory of the computer (3); whereby the buffered calibrated weight data is available for retrieval at any time in any order and current measured weight data and current non-calibratable data from the data acquisition devices (2) are retrievable in any order by the computer for display on the monitor (5).

12 Claims, 2 Drawing Sheets

METHOD AND DEVICE FOR A DATA MANAGEMENT SYSTEM WHICH IS CAPABLE OF CALIBRATION

BACKGROUND OF THE INVENTION

The invention relates to a method and device for calibrated acquisition and storage of ascertained measured value data requiring and not requiring calibration, in which the acquisition and storage comprises the adoption of these data from calibratable and/or noncalibratable measuring equipment by a calibratable storage medium, and at the same time with the adoption, the calibratable storage medium performs acquisition, identification, display and securing of the measurement data and performs the archiving of the measurement data in itself, and that these data are present in recallable form.

Approved calibratable measuring equipment corresponding to allowable models are known in weighing equipment or scales, among others. The calibration prerequirement is made here by human visual monitoring or by the "alibi" printer that is disposed directly on the scales. The measurement data, such as the sequential number of measured value data and optionally the time of measurement, are established using the printer. This does not provide reproducibility or reference, and especially if measured value data from a plurality of scales must be stored, manipulation-proof archiving is not provided by data documented with the "alibi" printer.

To overcome these disadvantages, and in particular to acquire calibratable measured value data from various measuring equipment and show them live and store them, various embodiments are known.

In accordance with British Patent GB 2 167 561, data from a plurality of scales are acquired, converted, shown in recallable form on the screen, and stored in memory in the computer. The "intelligence" of the scales is thus transferred to the personal computer.

The sole advantage is that the measured value data from a plurality of scales are shown on the screen live, individually or in succession, and because of the storage in memory can be recalled again; by integrating an "alibi" printer, the same test reports as are present in the calibratable scales can be documented with the "alibi" printer.

A device is also known from European Patent Disclosure EP 0 510 312, according to which scales are connected in a central station having at least one personal computer; the scales have hardware that make the weighing data, in digital form and provided with a suitable protocol, available to the central personal computer. The ascertained measured values for individual scales may be shown selectively individually or together on the screen. In this embodiment again, measured value data that are not recognized as calibratable are stored in memory in a known manner or further processed or printed out by means of evaluation equipment.

Hence this embodiment has the following disadvantages:
an access to the memory of the PCs is not precluded;
uninterrupted measured value processing is not provided for;
the data set has no reference number and no test number;
there is no calibration-required data path;
an access to the operating system level is not precluded; access to the operating system level is not blocked (single and multitasking operating position).

SUMMARY OF THE INVENTION

The object of the invention is to develop a method and a device for calibratable acquisition and storage of measured weight data that require calibration and other data that require calibration, with which the calibration monitoring is assured without any human action, and with which officially approved calibratable measured weight data can be established.

These ascertained measured value data that either require and/or do not require calibration should also be stored manipulation-proof and nonerasably as calibratable measured value data; they should be available in recallable form and be visibly shown on a picture.

According to the invention the method of acquiring, calibrating and storing measured weight, data in a secure manner and of acquiring and storing other non-calibratable measured data for display and processing includes the steps of:

a) providing a plurality of calibratable weight data acquisition devices and at least one non-calibratable data acquisition device for non-calibratable data other than weight;

b) providing an approved calibrating device in non-interacting dialogue with each data acquisition device, wherein the approved calibrating device comprises a computer including a first driver, a second driver, a monitor, a memory and an EEPROM card;

c) triggering the data acquisition devices to obtain measured weight data and non-calibratable data besides weight;

d) providing the measured weight data and non-calibratable data with references by means of the first driver, the second driver and the EEPROM card during transfer by the approved calibrating device;

e) calibrating the measured weight data to obtain calibrated measured weight data;

f) buffer-storing the calibrated measured weight data and the non-calibrated data in a manipulation-proof and non-erasable form on the EEPROM card; and g) transferring the buffered calibrated weight data from the EEPROM card to the memory of the computer.

In the method according to the invention the buffered calibrated weight data is available for retrieval at any time in any order and current measured weight data and current non-calibratable data from the data acquisition devices are retrievable in any order by the computer for display on the monitor.

The device according to the invention comprises a plurality of calibratable weight data acquisition devices for generating measured weight data that requires calibration and at least one non-calibratable data acquisition device for non-calibratable data other than weight and an approved calibrating device in non-interactive connection with each data acquisition device, the approved calibrating device comprising a computer including a first driver, a second driver, a monitor, a memory and an EEPROM card. The approved calibrating device includes means for providing the measured weight data that requires calibration and the non-calibratable data with references by means of the first driver, the second driver and the EEPROM card during transfer by the approved calibrating device; means for calibrating the measured weight data to obtain calibrated measured weight data; means for buffer-storing the calibrated measured weight data with the references in programmed fashion on the EEPROM card as buffered calibrated measured weight data in a manipulation-proof and non-erasable form and means for transferring the buffered calibrated measured weight data from the EEPROM card to the memory of the computer. The buffered calibrated measured weight data is available for retrieval at any time in any order and current measured weight data from the calibratable weight data acquisition devices connected with the approved calibrating device are retrievable in any order by the computer for display on the monitor.

The advantages of the invention are that the data set comprises not only the measured values but also the reference number with secret polynomials, a sequential number that assures the unequivocal association for the time of operation in calibration-required traffic (year, day of the week, scales number, etc.) and the test number;

that the measured value processing is uninterrupted;

that manipulation-proof archiving of the measurement data is provided for;

that the access to the memory is blocked;

that access to the DOS level is precluded;

that the measured value data cannot be adulterated or erased;

that by means of cross connection, both measured value data that require calibration and that do not require calibration in a measured value data ascertaining device can be transferred from one computer work station to another;

that measured value data are supplied to and processed by automatic data processing in real time;

that for the first time a major throughput of measured value data, especially in continuous weighing operations (weighing operations with a moving conveyor belt), is possible without error sources;

that the measured value data are shown on-line in a separate window on a screen in the form of a supplementary display or main display for additional measuring equipment.

BRIEF DESCRIPTION OF THE DRAWING

The objects, features and advantages of the invention will now be illustrated in more detail with the aid of the following description of the preferred embodiments, with reference to the accompanying figures in which:

In FIG. 1, the method and apparatus for calibratable acquisition and storage of ascertained calibration-required and non-calibration-required measured value data will be shown in terms of an approved calibrating devices 1, which is connected to calibratable and/or noncalibratable measurement data acquisition devices 2, but to at least one calibratable or noncalibratable measured value data acquisition device 2, and the approved calibrating devices 1 comprises at least a computer 3 with a memory unit, an operating unit 4, a screen 5, and a printer 6, and among other elements the computer 3 has two serial interfaces, that is, the interface I 7 for a driver I 8 and the interface II 9 for a driver II 10, and an EEPROM card 11. The EEPROM card 11 is an expansion card, which makes a nonvolatile memory available; the memory can be individually equipped and used.

Figure 1:
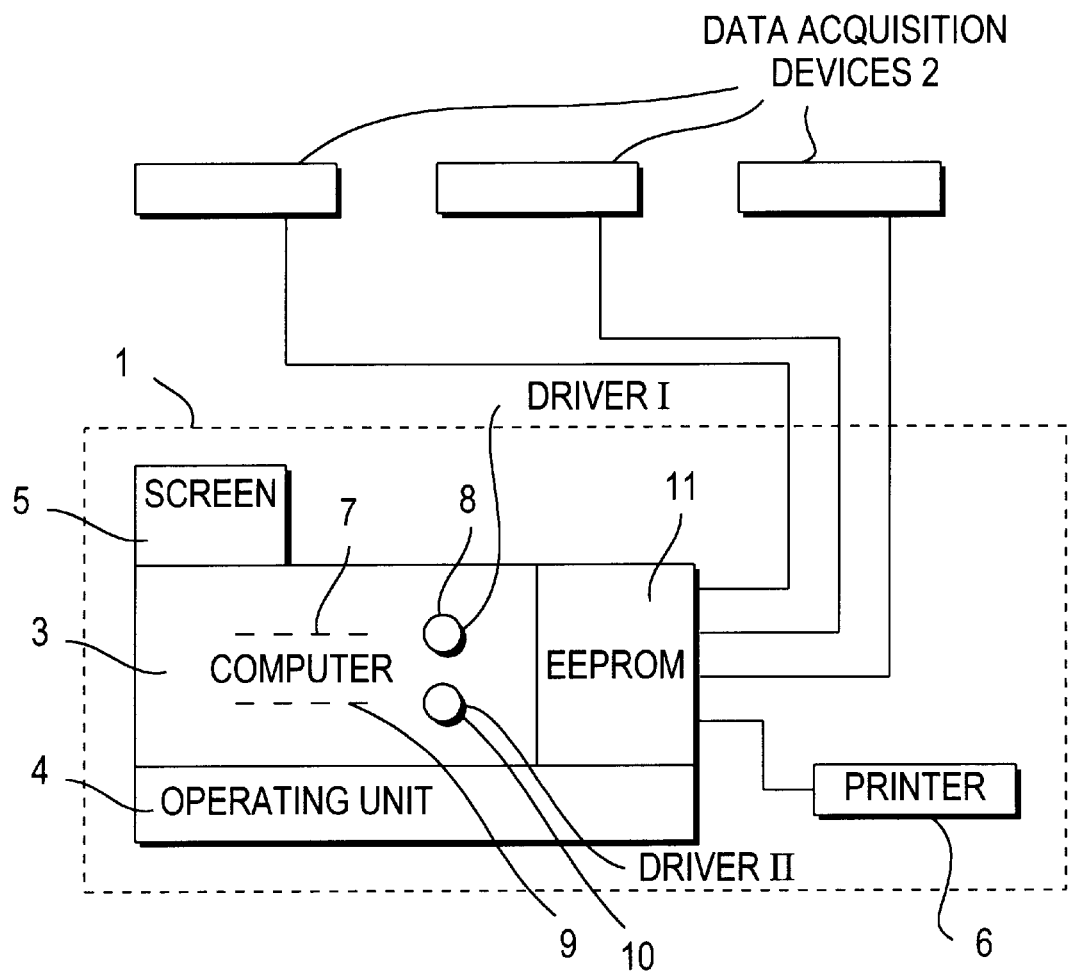
FIG. 1 is block diagram of a device for calibratable acquisition and storage of measured value data according to the invention shown together with a number of data acquisition devices.

The driver II 10, for example a device driver E01CQ, automatically defines the available capacity.

A flash EEPROM is comparable to an EPROM. It can be read out with normal memory cycles. The storage of data in memory, however, is done only with special programming algorithms. In comparison with EPROMs, the erasure in principle occurs only in modular fashion with the aid of its own erasing algorithm. It is thus possible for flash memories in the inserted state to be written and erased without requiring a special programming or erasing device, as with EPROMs, for the purpose. At the same time, unintentional erasure is thus no longer possible.

The EEPROM card 11 is provided with PAGING hardware. The specifically developed flash driver, as the driver II 10, is the interface of a specifically developed driver in IO-SYS, as are all scales drivers, for instance. It is a "calibration-required program" and in its name therefore carries the suffix "CQ" (such as flash driver E01CQ).

The driver I 8 is likewise characterized as a "calibration-required program" by a "CQ" at the end of its name.

For example, the novel driver I 8 for scales "X" is now W08CQ.EXE. The EEPROM card 11 can be preprogrammed for operation with this driver II 10 in production with an internal serial number.

The function calls are as follows:

The driver II 10 can be called up either from a specifically developed flash securing program (CQ program), which takes on the task of securing the calibration-required data from the flash memory in a memory unit, and from the driver I 8.

For flash memory management, the following OP codes are implemented (they can be expanded as needed):

| | | | Callup possible from | |
|---|---|---|---|---|
| OP code | Function | Comment | Scales drivers | Flash backup |
| 00 | OPEN | With status ascertainment | X | X |
| 01 | READ | Read set number xxxx | — | X |
| 11 | CHECK | Only status ascertainment | X | X[1)] |
| 15 | CHECK | Retroactively check CRC in transferred data set | — | X |
| 02 | WRITE | Store scales data set | X | — |
| 28 | WRITE | Erase entire memory | X | — |
| 03 | CLOSE | Close driver | X | X |
| 04 | ABORT | Abort last job | — | X |

Comment: [1)]Same function as automatically on OPEN

The sequence in monitoring weight using the driver I 8 is as follows:

Once the driver I 8 has received the weight request command from the applications program, it sends a request command to the calibratable and/or noncalibratable measurement data acquisition device 2 and waits for that data set. This process is possible only via the information of the interface description to the drivers I 8; II 10.

After the last byte of the weight string of the calibratable and/or noncalibratable measurement data acquisition device 2 is received, the data set is checked for validity (reception or logical errors). If there is an error, only the error code is returned to the requesting applications program, and this operation is thus terminated.

The programs of the application are started in this version by the same station (EEPROM card); the programs need not necessarily be stored in the same station. Typically, these applications programs are located in the same station or are connected to the memory unit (for instance in the network, disk drive, hard drive, or diskette).

The jobs can be remote-operated, remote-controlled, and tripped. If not, the driver I 8 prepares the relevant specifically developed standard weight data set from the received data and adds to the data its own driver channel number and its own driver names. This is the designation of the software interface with the measuring equipment.

Next, the driver II 10, with the OP code WRITE, is called up by the respective driver I 8, in order to program the relevant data set in manipulation-proof fashion into flash memory.

The driver II 10 now also adds the card serial number, the next sequential set number, and the current time and date to the relevant data set before it forms the CRC for the entire data set in accordance with a secret polynomial.

Next, this secured string is programmed, secure against network failure, into the flash EEPROM memory, and the new flash status is ascertained.

This specifically developed standard weight data set is then returned together with the current flash status to the driver I 8.

The thus reactivated driver I 8 now checks the return code (OK, or error code) of the E01CQ, and only if the feedback is positive is the weight data set plus the current flash status reported back.

The driver I 8 now continues to be inactive until the application hands it a new job. The securing is done by transmitting the calibratable data from the EEPROM card 11 to the memory unit of the computer 3.

The EEPROM cards 11 are provided with a sequential serial number during manufacture. This serial number (two bytes) is programmed with a 16-bit status word, for security reasons, into each assembled flash component.

For this reason, for secure operation of this driver II 10, at least two flash components must be used; otherwise, this error will be reported and further operation will be prevented.

Once the specifically developed flash security program has performed the erase command, this driver II 10 executes the following sequences:
1. Change the 16-bit status in the last component to "erase 1 started".
2. Erasure of the entire contents of the first flash component (so that the serial number stored in it is also lost).
3. Reprogramming of the serial number at the beginning of the first component after erasure has been done, with the status "serial number OK".
4. Individual erasure of all the following components with ensuing reprogramming of the serial number and the status "serial number OK status".
5. After the last component has been erased, it is also again given the serial number and the same status.
6. In conclusion, all the components are checked for the same serial number and the OK status, before the E01CQ driver reports the entire ascertained flash capacity to the calling program and thus makes it available to it.

The reason for this quite complicated sequence is that a power failure or unintentional turning off of the computer cannot be precluded during that time and hence the serial number of card 1 could be lost before it is reprogrammed again.

In the event of a premature abortion of the erase operation, this error status is reported to the security program in the next OPEN event; this program thereupon issues a new erase command, which the driver II 10 can now execute through to the end.

The function of the specifically developed flash security program is characterized in that each time the computer is booted up, the specifically developed security program is automatically started.

The instruction "to check the calibration-required data, please press (F10)" on the ADP screen appears for approximately 10 seconds.

If the function key F10 was actuated, a list 1 appears, with which the data files are displayed for the individual days when measurement was performed.

List 1: (Example)
Display of calibration-required data

| Name | Size | Date | Time |
|---|---|---|---|
| 940601.WDT | 24304 | 06/01/94 | 12:13 |
| 940602.WDT | 76260 | 06/02/94 | 12:13 |
| 940603.WDT | 68324 | 06/03/94 | 12:07 |
| 940604.WDT | 68200 | 06/04/94 | 09:52 |
| 940606.WDT | 68200 | 06/06/94 | 10:00 |
| 940607.WDT | 62496 | 06/07/94 | 09:50 |
| 940608.WDT | 60424 | 06/08/94 | 09:58 |
| 940609.WDT | 55800 | 06/09/94 | 09:54 |
| 940610.WDT | 55800 | 06/10/94 | 09:55 |
| 940611.WDT | 49958 | 06/11/94 | 09:51 |

Help can be reached via the function key (F1).

A selection of the measurement day can be made by the up arrow and down arrow, page up and page down, home and end keys, or by inputting the measurement date in the form YY/MM/DD.

After selection and confirmation using the enter key, the contents of the data file, which are the calibration-required data sets, appear on the ADP screen.

List 2: (Example)
Display of calibration-required data

| Number | Name | Time | Net weight | Tare weight | Gross weight | CRC |
|---|---|---|---|---|---|---|
| 0001 | W08E | 14:04:09 | 66,017 kg | 13,983 kg | 80,000 kg | 6263 OK |
| 0002 | W08E | 12:04:10 | 66,017 kg | 13,983 kg | 80,000 kg | 6A8A OK |
| 0003 | W08E | 12:04:11 | 66,017 kg | 13,983 kg | 80,000 | 92D2 OK |

By actuating the enter key, for instance, one returns to List 1.

The weights and measures inspector can now, using the data sets displayed, ascertain whether the weight shown on the invoice or shipping label output by the printer 6, for instance, matches the measured weight.

Comparison of the reference number, date, time by for example. The test number of the installed CQ programs appears on screen 5 next to list 1 on the right-hand edge of the screen.

Here, the channel number for the installed measuring device or devices 2 (not relevant for the calibration) is displayed and next to it the test number of the CQ programs (important for the calibration) installed on that channel.

After specific program initialization, the flash driver is given the OPEN command, which when returned reports the current memory status. The security program then checks the date of the last and first set in the flash memory by suitable READ commands. If the relevant data are from the same workday and if enough flash capacity is still available, the program ends its activity.

If not, then all the data are read out set by set, beginning with set 1, by suitable READ commands to the driver II 10 and copied to the memory unit. The CRC securing of each set is preserved, since the data are again deposited 1:1. Once the last READ operation can be concluded and the data have been stored in memory, the OP code CLEAR is given to the driver II 10, in order to erase the entire flash memory for the new workday.

After the positive acknowledgement of the flash driver, the securing program ends its activity.

When the calibration-required data are later read back from the memory unit for display on the screen 5, the data set is checked once again for adulteration with the aid of the CRC encoding via the secret polynomial, and any adulteration is displayed.

Once the securing program has ended, the specifically developed applications program (which is not calibration-required) is started. This program successively opens all the setup drivers I 8 (calibration-required programs, which have already been loaded at the beginning upon booting up).

Figure 2:
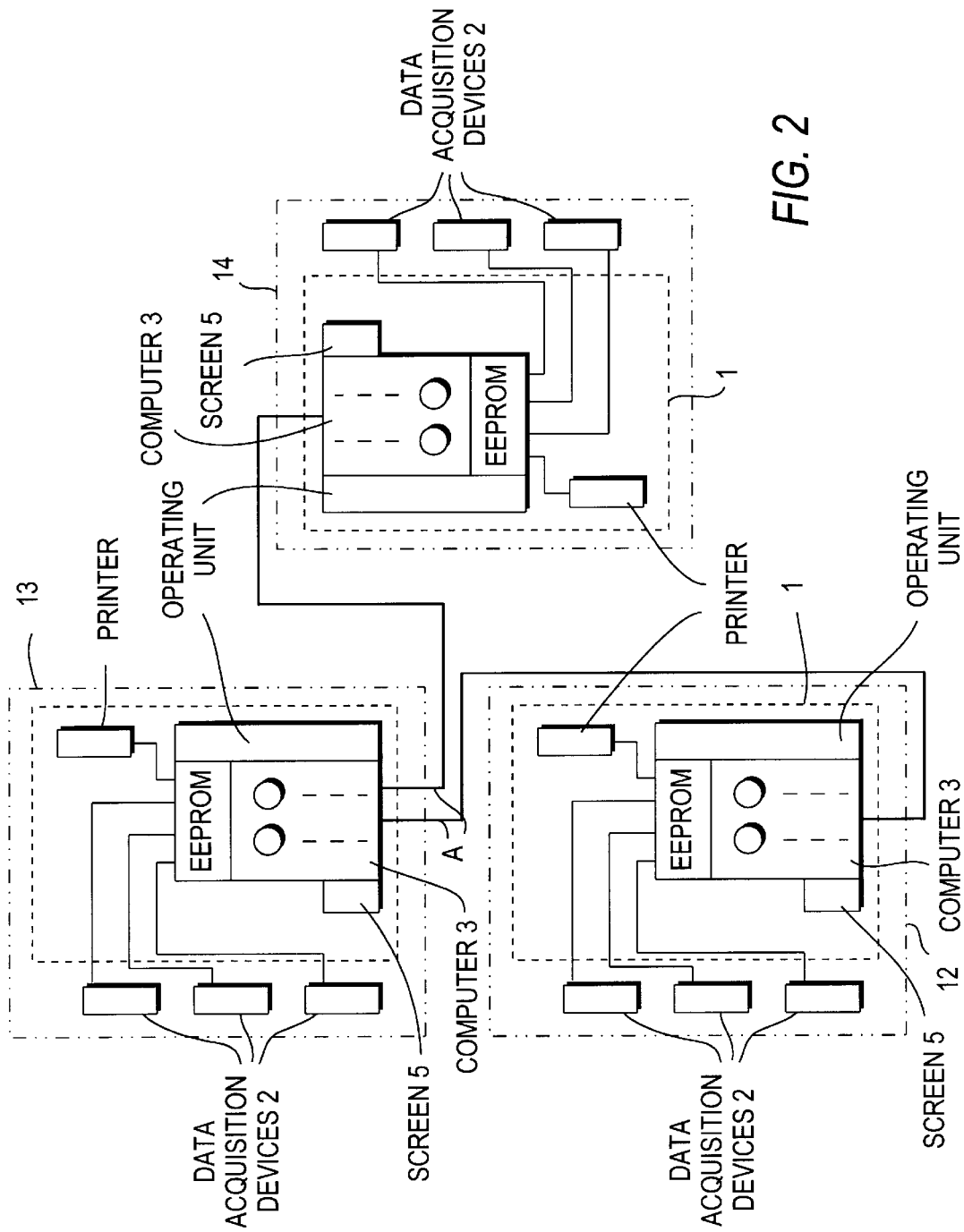
FIG. 2 is a block diagram of a plurality of workstations each consisting of a device for calibratable acquisition and storage of measured value data according to the invention and at least one data acquisition device.

In FIG. 2, the invention is shown in terms of computer work stations formed; each computer work station comprises the approved calibrating devices 1 and at least one calibratable measured value data acquisition device 2.

The approved calibrating device 1, as in the exemplary embodiment of FIG. 1, again comprise the control unit 4, the printer 6, and the computer 3 with memory unit; the computer 3 is assigned the interface I 7 for the driver I 8, the interface II 9 for the driver II 10, and the EEPROM card 11.

This equipment configuration, and the operative connection among the approved calibrating device 1 existing via the computer 3 produced a surprising, unexpected effect, which can be described as a cross connection of calibratable data.

By means of this cross connection, the measured value data requiring calibration and/or not requiring calibration of a calibratable and/or noncalibratable measurement data ascertaining device 2 can be transferred from one computer work station I 12 to another computer work station II 13.

Without cross connection, the existing measured value data requiring calibration and/or not requiring calibration of the calibratable and/or noncalibratable measurement data ascertaining device 2 are requested at the computer work station I 12 via the approved calibrating devices 1 and are deposited locally as calibratable measured value data in the memory of the computer 3 at the work station I 12 via the EEPROM card 11. These measured value data requiring calibration and/or not requiring calibration can be displayed as calibratable measured value data on the screen 5 of the work station I 12.

With the cross connection, at the work station I 12 one can trip the measurement of the calibratable and/or noncalibratable measured value data present at the work station II 13, by adopting them as calibratable measured value data by means of the approved calibrating devices 1 present in the work station II 13 and depositing them there locally, via the associated EEPROM card 11, in the memory of the computer 3; these calibratable measured value data can be displayed on the applicable screen 5 of the work station I 12 and/or the work station II 13.

Thus measured value data can be tripped from all n work stations III 14, even at the calibratable and/or noncalibratable measurement data acquisition devices 2 not connected to those work stations; these measured value data requiring calibration and/or not requiring calibration are acquired locally as calibratable measured value data at the respective work station by the respective approved calibrating devices 1 and provided with references, secured and stored, via the EEPROM card 11, in the memory unit of the respective computer 3; these calibratable measured value data can be displayed either locally or at the requesting n work station III 14 on the respective screen 5.

The method is characterized in that
an approved calibrating devices 1 is associated in feedback-free fashion in dialog with each calibratable and/or noncalibratable measurement data ascertaining device 2, that the measured value data requiring calibration and/or not requiring calibration are provided by the approved calibrating devices 1 during their transfer with references by means of a driver I 8 and driver II 10 and a EEPROM card 11 and buffer-stored in programmed fashion, first on the EEPROM card 11, as calibratable measured value data in manipulationproof and non-eraseable form;

that next, by the EEPROM card 11, the buffer-stored calibratable measured value data are transferred for security to the memory unit of the computer 3;

that the secured calibratable measured value data can be recalled at any time;

that the recallable calibratable measured value data and the currently present ascertained measured value data requiring calibration and not requiring calibration of the calibratable and/or noncalibratable measurement data acquisition device 2 can be recalled in arbitrary order by the computer 3 and visibly displayed on the screen 5, that the approved calibrating devices 1 is connected to at least one calibratable and/or noncalibratable measurement data acquisition device 2 to form a work station I 12; II 13, that the work stations I 12; II 13 are operatively connected to one another via their respective computers 3 through a line A, that n work stations III 14 can be associated with the work stations I 12; II 13, that from all the work stations I 12; II 13; III 14, measured value data can be tripped at one's own and at every other work station, and these ascertained measured value data requiring calibration and not requiring calibration are acquired locally at the respective work station where the calibratable and/or noncalibratable measurement data acquisition device 2 is located and are stored in secured fashion as calibratable measured value data, in that these data can be displayed both locally and at the requesting work station I 12; II 13; III 14 on the respective screen 5.

What is claimed is:

1. A method of acquiring, calibrating and storing measured weight data in a secure manner and of acquiring and storing other non-calibratable measured data for display and processing, said method comprising the steps of:

a) providing a plurality of calibratable weight data acquisition devices (2) and at least one non-calibratable data acquisition device (2) for non-calibratable data other than weight;

b) providing an approved calibrating device (1) in non-interacting dialogue with each of said data acquisition devices (2), wherein said approved calibrating device (1) comprises a computer (3) including a first driver (I,8), a second driver (II,10), a monitor (5), a memory and an EEPROM card (11);

c) triggering the data acquisition devices (2) to obtain measured weight data and non-calibratable data besides weight;

d) providing the measured weight data and non-calibratable data with references by means of the first driver (I,8), the second driver (II,10) and the EEPROM card (11) during transfer by the approved calibrating device (1);

e) calibrating the measured weight data to obtain calibrated measured weight data;

f) buffer-storing the calibrated measured weight data and the non-calibrated data in a manipulation-proof and non-erasable form on said EEPROM card (11); and g) transferring the buffered calibrated weight data from the EEPROM card (11) to said memory of the computer (3);

whereby said buffered calibrated weight data is available for retrieval at any time in any order and current measured weight data and current non-calibratable data from said data acquisition devices (2) are retrievable in any order by said computer for display on said monitor (5).

2. The method as defined in claim 1, further comprising providing at least one work station (I,12; II,13), each of which comprise one of said approved calibrating devices (1) and at least one of said data acquisition devices (2) linked to said one of said approved calibrating devices (1).

3. The method as defined in claim 1, further comprising a plurality of work stations (I,12; II,13), each of which comprises at least one of said data acquisition devices (2) and one of said approved calibrating devices (1) connected to said at least one of said data acquisition devices (2) and connecting said work stations with each other during operation thereof by means of a line (A).

4. The method as defined in claim 3, further comprising allocating an n-work station (III,14) to said work stations (I,12; II,13).

5. The method as defined in claim 4, further comprising retrieving said measured weight data obtained by one of said data acquisition devices (2) from any of said work stations (I,12; II,13) or said n-work station (III,14), whereby said measured weight data acquired and saved locally by said one of said data acquisition devices (2) in said work station connected with said one of said data acquisition devices is displayed both locally and in said workstation or said n-work station performing said retrieving.

6. A device for acquiring, calibrating and storing measured weight data in a secure manner and for acquiring and storing other non-calibratable measured data for display and processing, said device comprising:

a plurality of calibratable weight data acquisition devices (2) for generating measured weight data that requires calibration and at least one non-calibratable data acquisition device (2) for non-calibratable data other than weight; and an approved calibrating device (1) in non-interactive connection with each of said at least one data acquisition device (2), said approved calibrating device (1) comprising a computer (3) including a first driver (I,8), a second driver (II,10), a monitor (5), a memory and an EEPROM card (11);

wherein the approved calibrating device (1) includes means for providing the measured weight data that requires calibration and the non-calibratable data with references by means of the first driver (I,8), the second driver (II,10) and the EEPROM card (11) during transfer by the approved calibrating device (1); means for calibrating the measured weight data to obtain calibrated measured weight data; buffer-storing the calibrated measured weight data with the references in programmed fashion on said EEPROM card (11) as buffered calibrated measured weight data in a manipulation-proof and non-erasable form and means for transferring the buffered calibrated measured weight data from the EEPROM card (11) to the memory of the computer (3);

whereby said buffered calibrated measured weight data is available for retrieval at any time in any order and current measured weight data from said calibratable weight data acquisition devices (2) connected with said approved calibrating device (1) are retrievable in any order by said computer for display on said monitor (5).

7. The device as defined in claim 6, wherein said approved calibrating device (1) is linked together with said weight data acquisition devices (2) to form a work station (I,12; II,13).

8. The device as defined in claim 7, further comprising a plurality of said workstations (I,12; II,13) connected with each other by means of a line (A) in operation thereof.

9. The device as defined in claim 7, further comprising an n-workstation (N,14) to which said workstations (I,12; II,13) are connected.

10. The device as defined in claim 9, further comprising means for triggering retrieval of said measured weight data from any of said work stations (I,12; II,13) or said n-work station (III,14), whereby said measured weight data acquired and saved locally by said weight data acquisition devices (2) in said work station connected with said weight data acquisition devices is displayed both locally and in said work station or said n-work station triggering said retrieval.

11. The device as defined in claim 10, further comprising an application program stored in said computer in one of said work stations, wherein said application program includes means for retrieving said measured value data interactively and means for accounting, booking entries, remote transfer, reprocessing, archiving, evaluation and printing, whereby said application program no longer needs to be calibrated.

12. The method as defined in claim 11, further comprising means for displaying said measured weight data simultaneously or additionally on said monitor (5) or in an additional window provided on said monitor (5).

* * * * *